April 12, 1966 R. W. GRÄFF 3,245,121
APPARATUS FOR MAKING HARDENED REINFORCED
BANDS OF SYNTHETIC RESINS
Filed July 13, 1962 3 Sheets-Sheet 1

INVENTOR
R. W. Gräff
BY
Richards & Geier
ATTORNEYS

INVENTOR
R. W. Gräff
BY
Richards & Geier
ATTORNEYS

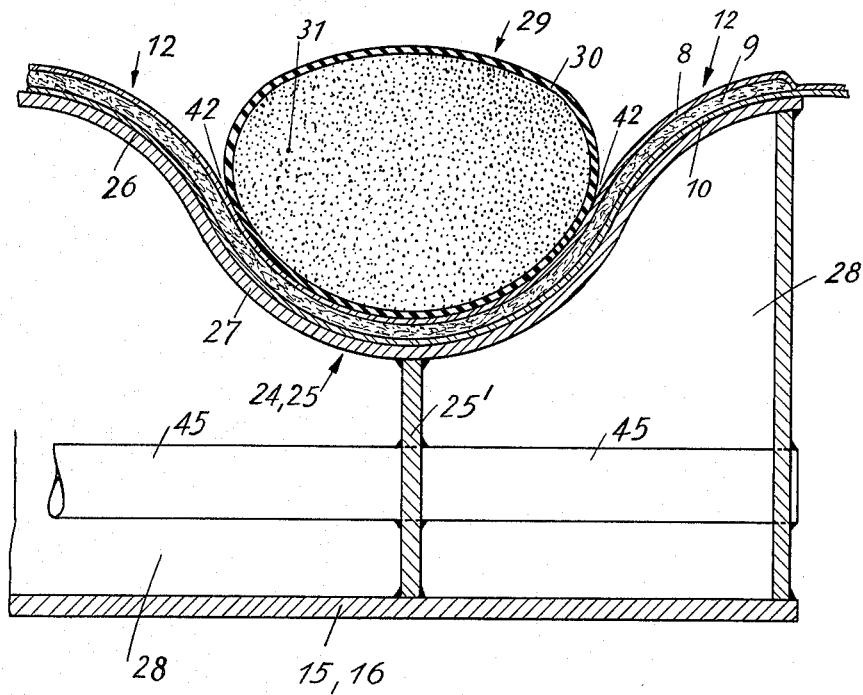

United States Patent Office 3,245,121
Patented Apr. 12, 1966

3,245,121
APPARATUS FOR MAKING HARDENED REINFORCED BANDS OF SYNTHETIC RESINS
Roderich Wilhelm Gräff, Burgberg, Villingen, Black Forest, Germany
Filed July 13, 1962, Ser. No. 209,726
Claims priority, application Germany, July 17, 1961, D 36,588
4 Claims. (Cl. 18—19)

This invention relates to an apparatus for making hardened reinforced bands of synthetic resins, such as polyester resins.

In prior art bands were made from reinforced liquid synthetic resin, for example, polyester resin reinforced by glass fibers, the band being covered on both sides by foils; the thus packaged ready band was profiled and then was drawn by a drawing tool through a continuous hardening furnace, in order to harden the band.

Practical experience has shown that the profiling of such bands by means of the usual drawing tools is not satisfactory and that the tool can tear the band which has not acquired as yet sufficient tensile strength; for that reason it was found advisable to use a tool which is open on the top and which has the shape of a plate-like body providing an elongated sliding path to exert profile-forming pressure upon the undersurface of the band, whereby the plate-like body is constructed as a heating plate. According to the same construction the pressure upon the profile-forming surface of the sliding path is produced by weights placed on top of the band, such as sacks filled with sand, iron particles or the like.

A tool of this type provides for the hardening of the intermediate band of reinforcing material which is saturated with the liquid resin, before it leaves the sliding path of the tool.

Practical experience has shown that it is most important to maintain the temperature of the saturated and packaged band within narrow precise limits. In the first place, the band must be heated as quickly as possible to the hardening temperature; on the other hand, the hardening process develops by itself additional heat which can raise the temperature to such an extent that evaporation bubbles will appear in the band. These developments must be particularly carefully considered, since recently resins, such as methacrylate casting resins, have appeared on the market which are particularly sensitive to an increase in temperature beyond the hardening temperatures, so that evaporation bubbles can easily develop therein. Attempts have been made to prevent this evaporation by blowing cooling air upon locations wherein the exothermic reaction is particularly effective. This procedure provides only limited relief since the sand-filled sacks lying upon the band, insulate it to a large extent. A limited relief was also provided by subdividing the long sacks, which may have the length of about three meters, into several smaller sacks having lengths of from 20 to 40 centimeters, for example, which are spaced one from the other. While the band could be better cooled in the free spaces between the sacks, the proper pressure of the band upon the sliding path could not be maintained any more.

An object of the present invention is to eliminate these drawbacks of prior art constructions.

Other objects will become apparent in the course of the following specification.

The present invention is concerned with an apparatus for hardening bands of reinforced synthetic resin, especially those produced upon a polyester machine, whereby the band is guided along heat supplying stationary surfaces of the apparatus while being subjected to pressure for producing plane or transverse wavy profiles. One of the main characteristic features of the present invention is that the pressure surfaces constitute limiting outer walls of a hollow space in the profile-forming tool and that a heated liquid flows through this space.

Since the heated liquid is pumped or sucked through the hollow spaces, the temperature of this liquid can be examined and maintained very precisely, and thus it is possible to set precisely the heat exchange at pressure surfaces.

A further feature of the present invention consists in that the pressure surfaces located under the band extend contiguous with the entire surface of the band and that the pressure surfaces located above the band are formed by hose-like sacks lying in the depressions of the waves.

These constructions facilitate a quick heat exchange between the limiting walls and the band which is to be profiled and hardened. Due to the fact that the undersurface of the band is completely covered, the heating of the band can take place in the shortest possible time and since on top of the band the covering is combined with parallel intermediate spaces, it can be quickly cooled.

The construction is preferably such that the above-described hollow spaces are connected to an apparatus for circulating and adjustably heating the liquid, for example, an electrically operated automatically regulatable oil heating apparatus with a pump for the liquid. In order to provide a temperature control within particularly narrow limits, the sacks can be connected to an aggregate, either individually or in parallel. Oil can be used as the heat carrier for the circulation of the liquid; furthermore, the hollow interior of each sack can be connected to a coiled conduit which will regulate its temperature.

The invention will appear more clearly from the following detailed description when taken in connection with the accompanying drawings showing by way of example, preferred embodiments of the inventive idea.

In the drawings:

FIGURE 5 is a portion of a section similar to that of FIG. 4 in approximate actual size.

Figure 1:
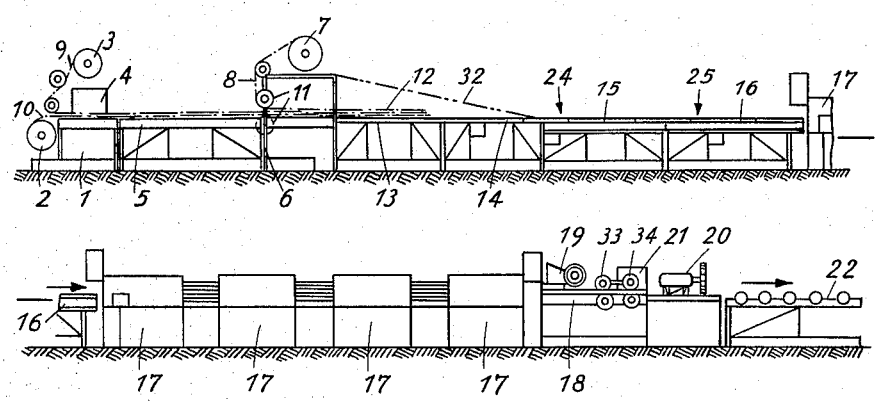
FIGURE 1 is a side view of a polyester machine.
Figure 2:
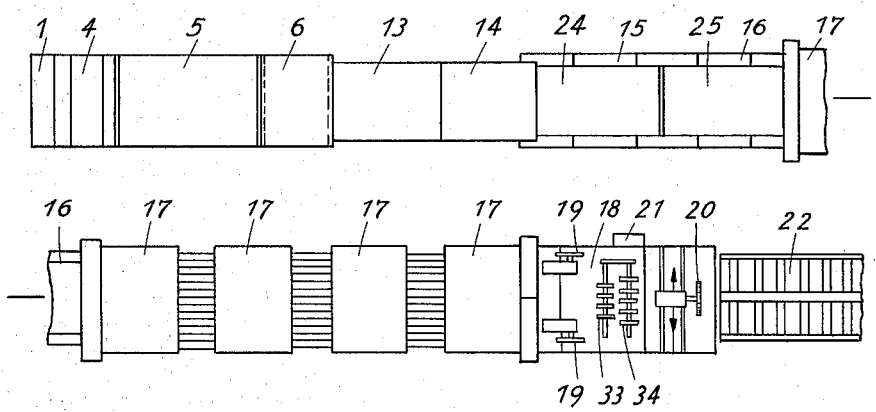
FIGURE 2 is a top view of the same machine.

The polyester machine shown in FIGURES 1 and 2 includes a number of supports or tables located in a row one behind the other. At the rear end of the machine (shown in the upper left-hand corner of FIGS. 1 and 2), a support 1 carries a roller 2 which delivers the lower band consisting of thin foil; the support 1 also carries a roller 3 which delivers a mat of reinforcing material, consisting preferably of glass fibers. The support 1 carries an impregnating device 4 for impregnating the mat with liquid synthetic resin; a table 5 is also provided for impregnation. A support 6 for the squeezing rollers carries a roller 7 for the upper band 8 consisting of thin foil. The band 8 along with the lower foil band 10 and the band 9 packaged between the two foil bands and consisting of reinforcing material impregnated with synthetic resin, is drawn between the pair of squeezing rollers 11 to form the compound band 12 which passes through run out tables 13 and 14 to the forming tables or casings 15 and 16. These tables are followed by the casings 17 of the continuous furnace, the support 18 for the saw devices 19 and 20 and the drive 21 for the band, while the receiving table 22 is located at the extreme right of FIGS. 1 and 2.

Figure 3:
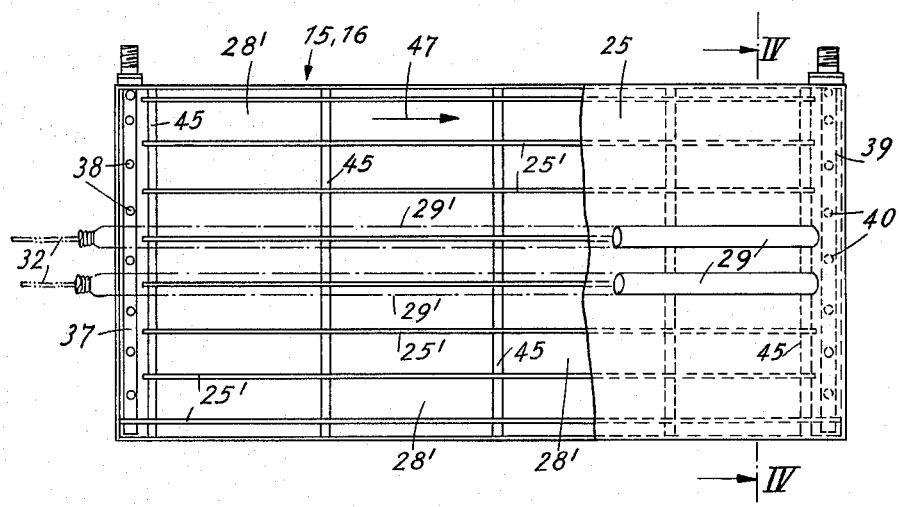
FIGURE 3 is a top view of a plate-like tool body on an enlarged scale.
Figure 4:
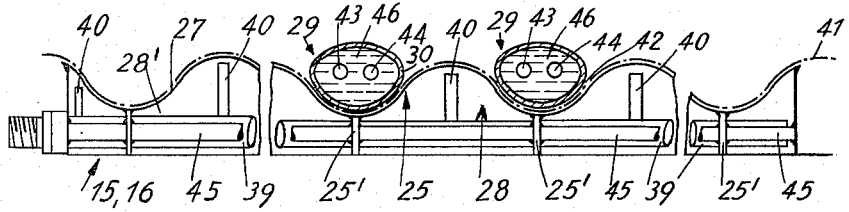
FIGURE 4 is a transverse section along the line IV—IV of FIG. 3.

The profile-producing tool consists of two substantially equal parts 24 and 25 located one behind the other. As shown in FIGS. 3 to 5, the tool has the shape of an elongated plate-like body. The upper surface 26 of the tool, which may have the length of about three meters, serves as the profile-producing sliding surface imparting a profile to the band when the latter is pressed against it. The surface is wave-like. Thus due to the provision of corrugations 27, longitudinal crests and troughs are formed in the sheet. The tool body 24 constitutes the top of the forming casing 15, while the tool body 25 constitutes the top of the forming casing 16. The tool bodies can be easily connected with their supports merely by spot welding.

The tool bodies 24 and 25 are constructed as heating plates. For that purpose each tool body constitutes an outer wall of one or more hollow spaces 28 within the casings 15 and 16.

FIGURE 5 shows how the composite band 12 consisting of the upper covering foil 8, the intermediate band 9 of reinforcing material impregnated with synthetic resin and the lower covering foil 10, is pressed against and thus profiled by the sliding surface 26 through pressure exerted by weights (generally designated by the numeral 29), in combination with the pulling or tensioning forces exerted upon the band.

The weights 29 consist of sacks with smooth walls made of an opaque material. The walls 30 of each sack enclose the weight mass, adjustably filling the sack and consisting, for example, of sand. There is provided a separate tube-shaped sack with closed ends for each wave depression of the band.

The rear end of each tube-shaped sack is firmly connected to the machine frame, for example, by means of a cable connection 32 (FIGS. 1 and 3). The sacks are not attached by any other means so that they float on the web and flexibly adapt themselves to the corrugations.

The two pairs of adjustable driving and clamping rollers 33 and 34 of the drive 21 when continuously rotated, will provide that the band will continuously move through the profiling device. This drive makes it also possible to regulate the traction force exerted upon the band in such manner that this force along with the pressure of the band upon the front tool body 25 will provide a relative longitudinal stretching of the band during the hardening which being at that time.

The forming tables 15 and 16 enclose a hollow space 28, shown in FIGS. 4 and 5. The hollow space is covered and closed by the profile-forming tool body 25. The hollow space 28 is divided into chambers 28' by longitudinal ledges 25' supporting the tool body 25 and strengthened transversely by round rods 45.

Figure 6:
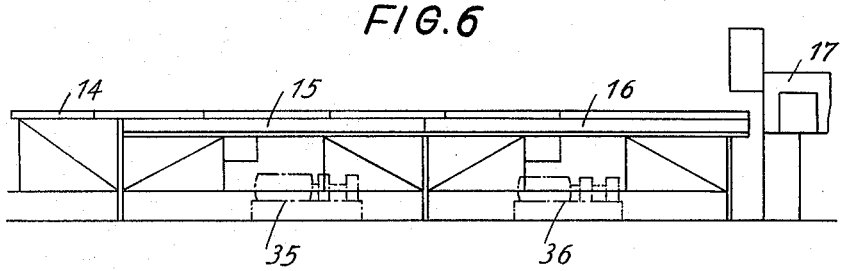
FIGURE 6 is a side view of a portion of the machine showing the heating installation.

The band pressed against the upper surface 26 can slide thereon under tractional force in the direction of the arrow 47 (FIG. 3). A heated liquid, preferably oil, flows through all hollow spaces 28'. Known oil heating devices with pumps 35, 56 (FIG. 6) are used for the circulation of the liquid. A distributing pipe 37 is located close to the floor level at the rear end of the composite space 28 for the inflow of the liquid. The free end of the pipe 37 is closed; on the top it has openings 38 which open into each space 28'. A similar pipe 39 is located at the front end of the composite space 28 for removing the liquid by suction. The pipe 39 carries tubular joints 40 extending into each hollow space 28', whereby the suction openings of these joints are located directly under the tool body 25.

FIGURE 3 shows the band by broken lines 29'. It is apparent that hose-like sacks 29 form pressure surfaces 42 located above the band. Each sack 29 nests within a separate depression of the wave-like structure.

According to a further embodiment of the present invention, a heat exchanging liquid 46 can also flow through hollow spaces provided within each sack; as indicated in FIG. 4, the liquid can flow in and out through conduits 43 and 44.

It is apparent that the examples shown above have been given solely by way of illustration and not by way of limitation, and that they are subject to many variations and modifications within the scope of the present invention. All such variations and modifications are to be included within the scope of the present invention.

What is claimed is:

1. In an apparatus for producing a lengthwise corrugated sheet from a progressively moving sheet-like laminate consisting of a layer of fibrous material impregnated with a fluid hardenable synthetic resin and covered by a film wrapper, an elongated stationary forming platform having a lengthwise corrugated surface with crests and troughs, means for heating said platform from underneath, stationary hollow elongated supple weighting bodies overlying the troughs of said platform and extending in their direction, means for floatably fixing said weighting bodies at one end, heat-exchanging means in the interior of said weighting bodies, and means for lengthwise drawing said laminate through in between said stationary forming platform and said weighting bodies.

2. An apparatus according to claim 1, wherein the heat-exchanging means in the interior of the weighting bodies are traversed by a liquid heat-exchanging medium.

3. An apparatus according to claim 1, wherein the fixing means of the weighting bodies are means supplying a liquid heat-exchanging medium to the interior of said weighting bodies.

4. An apparatus according to claim 1, wherein the weighting bodies are hose-like sacks filled with a yielding material.

References Cited by the Examiner

UNITED STATES PATENTS

| | | | |
|---|---|---|---|
| 1,450,222 | 4/1923 | Pattison. | |
| 2,312,587 | 3/1943 | Price | 25—128 |
| 2,363,779 | 11/1944 | Duffy et al. | 18—17 |
| 2,411,043 | 11/1946 | Klassen | 18—17 |
| 2,441,699 | 5/1948 | Gramelspacher. | |
| 2,623,261 | 12/1952 | Semeraro | 25—128 |
| 2,717,421 | 9/1955 | Beeson | 18—17 |
| 2,784,763 | 3/1957 | Shorts | 156—206 X |
| 2,794,481 | 6/1957 | Anderson | 25—28 |
| 3,032,452 | 6/1962 | Magnaguagno | 18—19 X |
| 3,050,109 | 8/1962 | Monaco | 156—206 X |
| 3,071,180 | 1/1963 | Finger et al. | 156—595 X |

WILLIAM J. STEPHENSON, *Primary Examiner.*

EARL M. BERGERT, *Examiner.*